(12) United States Patent
Lin

(10) Patent No.: US 8,295,605 B2
(45) Date of Patent: Oct. 23, 2012

(54) METHOD FOR IDENTIFYING DIMENSIONS OF SHOT SUBJECT

(75) Inventor: Jia-Yih Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 602 days.

(21) Appl. No.: 12/580,473

(22) Filed: Oct. 16, 2009

(65) Prior Publication Data

US 2010/0104195 A1 Apr. 29, 2010

(30) Foreign Application Priority Data

Oct. 28, 2008 (TW) ................................ 97141430 A

(51) Int. Cl.
*G06K 9/46* (2006.01)
*G06K 9/00* (2006.01)
*G06K 9/40* (2006.01)

(52) U.S. Cl. .................. 382/195; 382/154; 382/255

(58) Field of Classification Search .................. 382/154, 382/195, 218, 103, 255, 286; 348/47–50
See application file for complete search history.

(56) References Cited

U.S. PATENT DOCUMENTS

| 7,679,616 B2 * | 3/2010 | Nomura et al. ............... 345/419 |
| 2005/0285945 A1 | 12/2005 | Usui et al. |
| 2007/0003267 A1 | 1/2007 | Shibutani |

\* cited by examiner

*Primary Examiner* — Daniel Mariam
(74) *Attorney, Agent, or Firm* — Thomas, Kayden, Horstemeyer & Risley, LLP

(57) ABSTRACT

The present invention relates to a method for identifying dimensions of shot subject, implemented on an identification system including a photo shooting unit capable of adjusting focal lengths. The method includes steps of using the photo shooting unit to focus on plural positions respectively having different field depths on a shot subject and respectively capture a image thereof, determining whether resolutions of the captured images are same, and if so, the shot subject is a two dimensional object, otherwise, the shot subject is a three dimensional object.

10 Claims, 8 Drawing Sheets

METHOD FOR IDENTIFYING DIMENSIONS OF SHOT SUBJECT

RELATED APPLICATIONS

This application claims priority to Taiwan Application Serial Number 97141430, filed Oct. 28, 2008. which is herein incorporated by reference.

BACKGROUND

1. Field of Invention

The present invention relates to a method for identifying images, more particularly to a method for identifying the dimensions of the subject of an image.

2. Description of Related Art

Since images shot by a camera device are normally two dimensional, a security surveillance system or a face recognition system using the camera device may have difficulty determining whether the subject of a shot image is a two-dimensional (2-D) or three-dimensional (3-D) object, especially for human faces.

When a high-definition image of a human face picture is placed in front of a security surveillance system or a face recognition system for an identification check, the security surveillance system or the face recognition system may not able to identify whether the human face is real or fake; so as long as facial features of the face identified by the security surveillance system or the face recognition system meets the identifying conditions set thereof, a picture of a face can deceive the security surveillance system or the face recognition system and then passes the identification check thereof. Therefore the security surveillance system or the face recognition system might fail the security check and actual face identification.

SUMMARY

The present invention provides a method for quickly identifying whether an object being captured by a camera is a two dimensional or a three dimensional object.

The method can be implemented on an identification system. The identification system includes a photo shooting unit which is capable of adjusting focal lengths. The method comprises steps of using the photo shooting unit to focus on some positions respectively having different field depths on a shot subject and to capture some images of the focused positions on the shot subject; comparing and determining whether resolutions of the captured images are the same or not; and when the resolutions of the captured images are the same, the system acknowledges the shot subject is a two dimensional object, or when the resolutions of the captured images are not the same, the system acknowledges the shot subject is a three dimensional object.

As described above, when the shot subject is a two dimensional object, the resolutions of the shot subject in the captured images is not changed in focusing on different positions of the shot subject that have different focal lengths. Thus, the method for identifying the dimensions of a shot subject disclosed by the present invention provides a rapid manner to identify the dimensions of the shot subject and provides the identification result to the identification system for future applications.

Another solution provided by the present invention is to provide a method for identifying dimensions of the shot subject. The method can be implemented on an identification system. The identification system includes a photo shooting unit capable of adjusting focal length. The method comprises steps of using the photo shooting unit to capture an image of a shot subject; using the photo shooting unit to zoom in on a part of the shot subject; using the photo shooting unit to focus on the zoomed part of the shot subject and to capture another image of the zoomed and focused part of the shot subject; comparing and determining whether resolutions of the captured images are the same or not; and when the resolutions of the captured images are the same, the shot subject is a three dimensional object or when the resolutions of the captured images are not the same, the shot subject is a two dimensional object.

As described above, when the shot subject is a three dimensional object, an image of a shot subject itself without being zoomed and another image captured from a part of the shot subject in which the image is zoomed in by a certain image magnification ratio and a focal length thereof is adjusted on the part thereof, are exactly same in resolutions outputting by the photo shooting unit according to an output resolution set of the photo shooting unit.

Thus, the method for identifying dimensions of a shot subject disclosed by the present invention provides a rapid manner to identify the dimensions of the shot subject and provides the identification result to the identification system for further applications.

BRIEF DESCRIPTION OF THE DRAWINGS

The structure and the technical means adopted by the present invention to achieve the above and other objectives can be best understood by referring to the following detailed description of the preferred embodiments and the accompanying drawings, where.

DESCRIPTION OF THE PREFERRED EMBODIMENTS

When a photo shooting unit is aimed to a shot subject, a focus position can be set on a part of the shot subject, therefore, a certain focal length between lens of the photo shooting unit and the part of the shot subject will be corrected when the photo shooting unit processes a focusing operation on the part of the shot subject, so the shot subject shown on which the photo shooting unit focuses is adjusted clearly to an optimal status, and the remaining part of the shot subject and background objects therefore are seen as blurry or vague objects. On the other hand, when the photo shooting unit processes a full-scale focusing operation on the shot subject, the shot subject and its background objects will not be adjusted particularly to an optimal status and a vague status.

Figure 1:
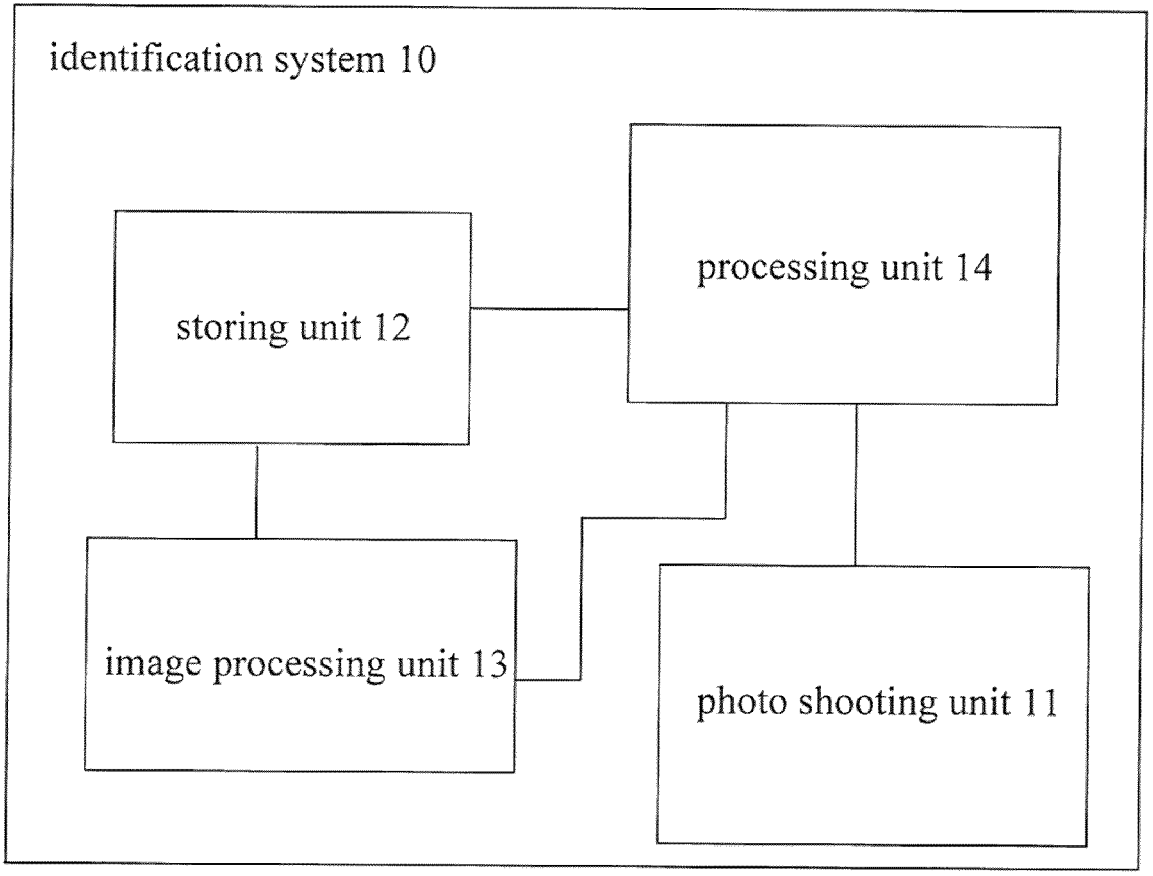
FIG. 1 is an electrical block diagram of an identification system of one preferred embodiment of the present invention.

The present invention provides a method for identifying dimensions of a main object, which can be implemented on an identification system of a security surveillance system or a face recognition system. An identification system is adopted herein for illustration. One preferred embodiment of the present invention is shown in FIG. 1, which is an electrical block diagram of an identification system of one preferred embodiment of the present invention. The identification system 10 at least includes a photo shooting unit 11, a storing unit 12, an image processing unit 13 and a processing unit 14. For example the photo shooting unit 11 could be a digital photo shooting unit, the processing unit 14 could be a central processing unit. The photo shooting unit 11 is placed in a position where a shot subject (e.g. human face) can be captured, and the photo shooting unit 11 has a focusing function for adjusting focal lengths so that the photo shooting unit 11 can focus correctly on the specified portion of the shot subject.

The image processing unit 13 is respectively connected to the storing unit 12 and the processing unit 14 for receiving plural images captured by the photo shooting unit 11 and calculating pixels of each of the captured images. The storing unit 12 is connected to the processing unit 14 and stored plural face shapes, pupils or other image information therein for further comparisons. The processing unit 14 is respectively connected to the photo shooting unit 11, the storing unit 12 and the image processing unit 13 for controlling the photo shooting unit 11, the storing unit 12 and the image processing unit 13.

Figure 2A:
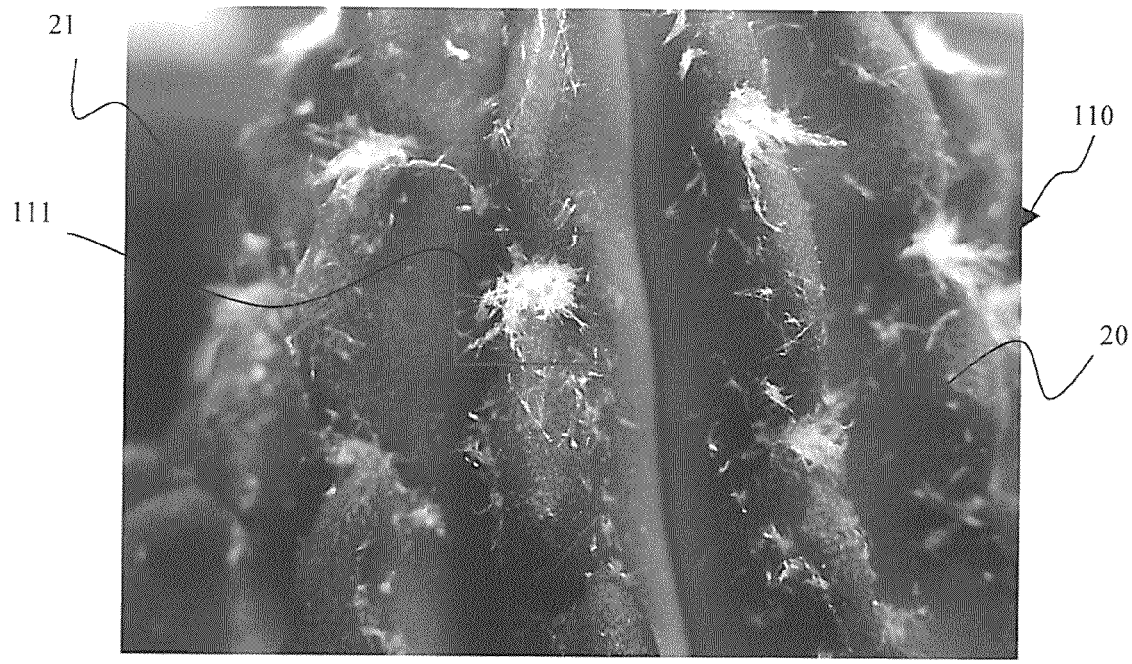
FIG. 2A is a schematic view of a three dimensional shot subject being focused on a part thereof by the photo shooting unit.
Figure 2B:
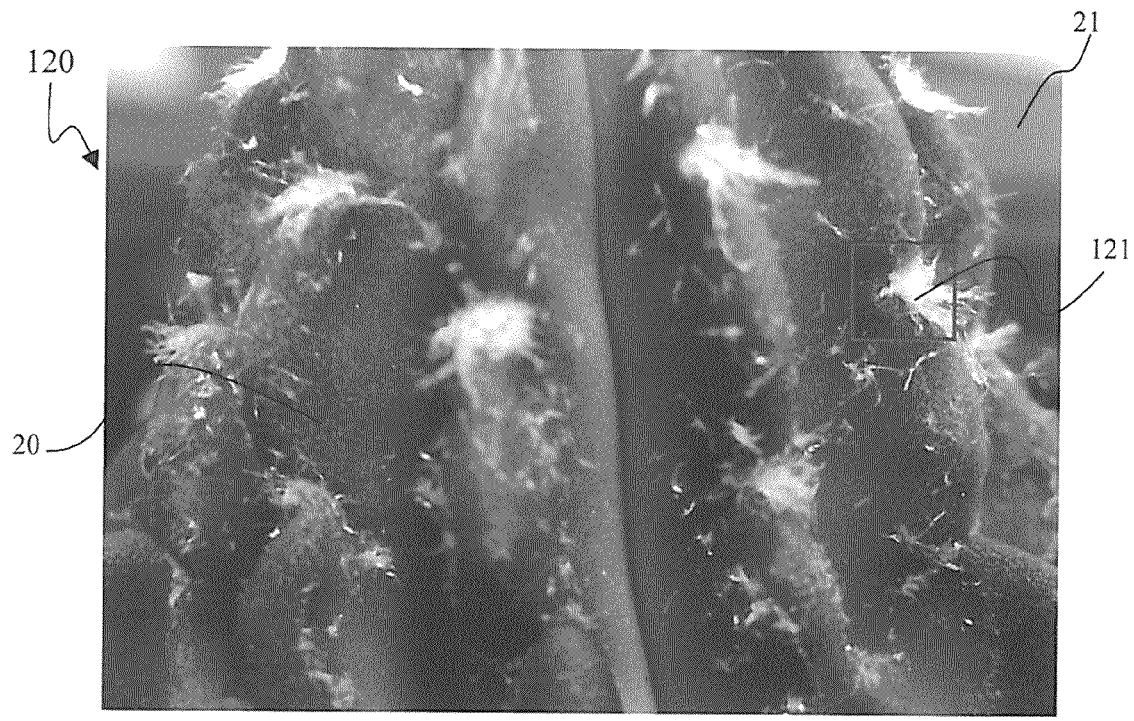
FIG. 2B is another schematic view of the three dimensional shot subject being focused on another part thereof by the photo shooting unit.

Application features and embodiments of the method for identifying dimensions of a shot subject are illustrated as follows:

Feature one: three dimensional object with different field depths on parts thereof Refer to FIG. 2A and FIG. 2B. FIG. 2A and FIG. 2B are schematic views of a three dimensional shot subject being focused on parts thereof by the photo shooting unit 11, respectively. When the photo shooting unit 11 processes a photo shooting operation, if the shot subject 20 and a background object 21 are not on the same focusing plane, or the shot subject 20 itself has three dimensional outlines, the field depths of the shot subject 20 and the background object 21 are not the same. So focal positions of the shot subject 20 and the background object 21 set by the photo shooting unit 11 are different and might generate different resolutions between the shot subject 20 and the background object 21.

Figure 2C:
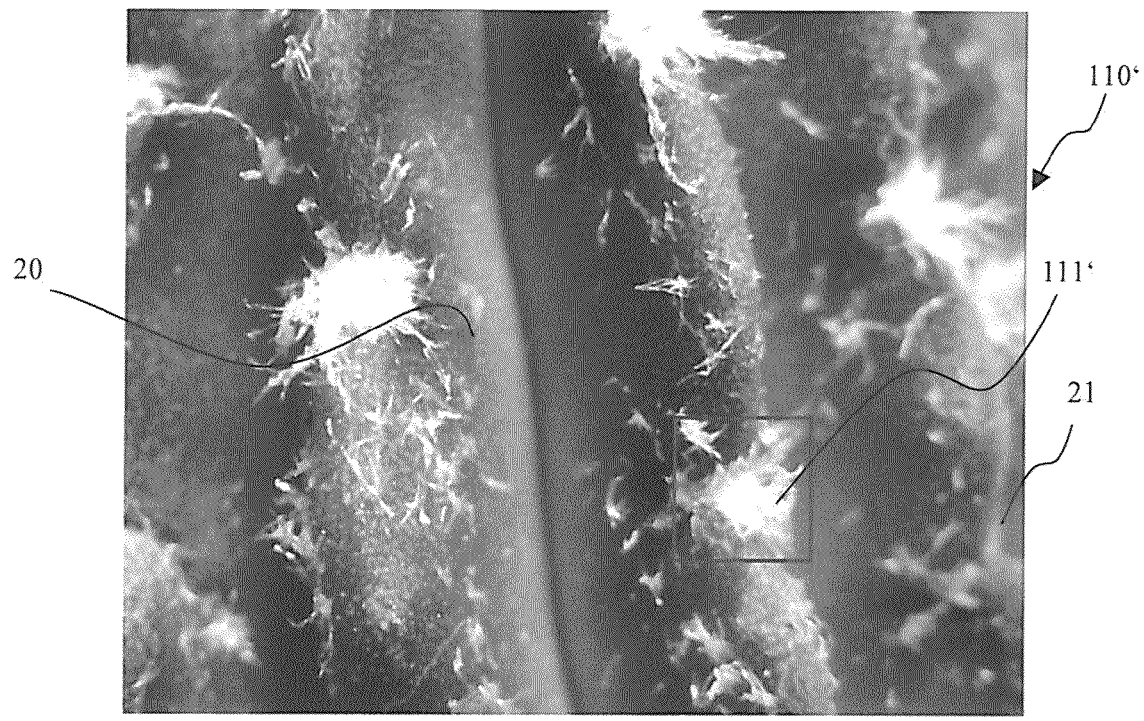
FIG. 2C is a schematic view of a two dimensional shot subject being focused on a part thereof by the photo shooting unit.
Figure 2D:
FIG. 2D is another schematic view of the two dimensional shot subject being focused on another part thereof by the photo shooting unit.

On the other hand, referring to FIG. 2C and FIG. 2D, which are schematic views of a two dimensional shot subject being focused on parts thereof by the photo shooting unit 11, respectively. If the shot subject 20 is a plane image/pattern, there is no different field depth generated by the shot subject 20. So regardless of the focal positions set by the photo shooting unit 11, the resolution of the shot subject 20 remains the same and the resolution will be degraded when being shot again.

In this embodiment, when the identification system 10 is processed an identifying operation and the photo shooting unit 11 faces the shot subject 20, the processing unit 14 processes the following steps on the shot subject 20 to determine the dimensions of the shot subject 20 according to the property of differences of field depths.

Figure 3:
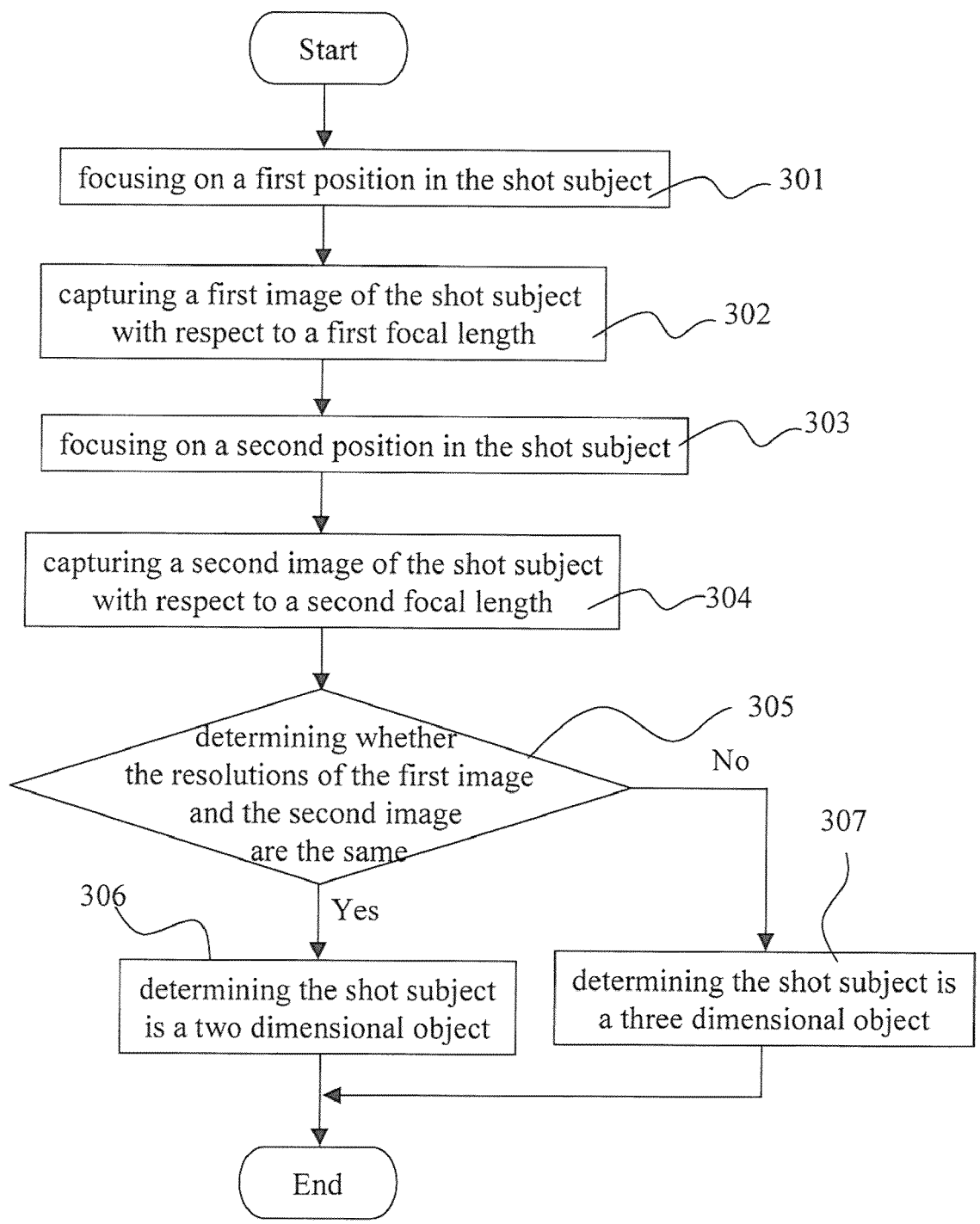
FIG. 3 is a flow chart of one embodiment of the method for identifying dimension of a shot subject provided by the present invention.

Refer to FIG. 3. FIG. 3 is a flow chart of one embodiment of the method for identifying dimensions of a shot subject provided the present invention, while referring to FIG. 1, FIG. 3 and FIG. 2A~FIG. 2D shall be referred together for a better understanding.

Step 301: focusing on a first position in the shot subject 20 (refer to FIG. 2A and FIG. 2C).

In this step, the photo shooting unit 11 firstly obtains a lens field, which is a field showing an outdoor scene with respect to the lens, of the shot subject 20, the photo shooting unit 11 then is activated by a focusing function thereof by the processing unit 14 so a first focus position 111 or 111' is defined by the photo shooting unit 11 with respect to the first position in the shot subject 20 shown in the lens field, so a focusing operation is able to be processed on the first focus position 111 or 111', a first focal length is therefore obtained.

Step 302: capturing a first image 110 or 110' of the shot subject 20 with respect to the first focal length by the photo shooting unit 11.

In this step, the first image 110 or 110' is captured by the photo shooting unit 11 according to the first focal length. Therefore, the first focus position 111 or 111' is adjusted to an optimal status.

Step 303: focusing on a second position in the shot subject 20 (refer to FIG. 2B and FIG. 2D).

In this step, with respect to the second position in the shot subject 20, a second focus position 121 or 121' is defined by the photo shooting unit 11, so a focusing operation is able to be processed on the second focus position 121 or 121', a second focal length is therefore obtained; wherein the first position and the second position are preferably defined on locations of the shot subject 20 that are supposed to have different field depths between the lens of the photo shooting unit 11 and the positions thereof.

Step 304: capturing a second image 120 or 120' of the shot subject 20 with respect to the second focal length by the photo shooting unit 11.

In this step, the second image 120 or 120' is captured by the photo shooting unit 11 according to the second focal length. Therefore, the second focus position 121 or 121' is adjusted to an optimal status.

In this embodiment, the photo shooting unit 11 not only can capture two images but can also capture more images for increasing the sampling accuracy.

Step 305: comparing the first image 110 and the second image 120 (or the first image 110' and the second image 120') and determining whether the resolution of the first image 110 and the resolution of the second image 120 (or the resolution of the first image 110' and the resolution of the second image 120') are the same or not.

Whenever an image is captured by the photo shooting unit 11, the image is temporarily stored in the storing unit 12, the image processing unit 13 is served to calculate total pixels of the image stored in the storing unit 12 so when at least two images are captured, a resolution comparison is able to be processed by the processing unit 14. When the processing unit 14 determines that the total pixels of the first image 110 and the total pixels of the second image 120 (or the total pixels of the first image 110' and the total pixels of the second image 120') are the same, the shot subject 20 is determined to be a two dimensional object and Step 306 is therefore processed next;

Otherwise, when the processing unit 14 determines that the total pixels of the first image 110 and the total pixels of the second image 120 (or the total pixels of the first image 110' and the total pixels of the second image 120') are not the same, the shot subject 20 is determined to be a three dimensional object and step 307 is therefore processed next.

Also, In this step 305, means of calculating the total pixels of the first image 110 and the total pixels of the second image 120 (or the total pixels of the first image 110' and the total pixels of the second image 120') and means of comparing the resolution of the first image 110 and the resolution of the second image 120 (or the resolution of the first image 110' and the resolution of the second image 120') are not limited.

Step 306: determining the shot subject 20 is a two dimensional object for providing to the identification system 10 for further applications:

Refer to FIG. 2C and FIG. 2D, in this embodiment, reason for "determining the shot subject 20 is a two dimensional object is that when the processing unit 14 determines that the total pixels of the first image 110' and the total pixels of the second image 120' are the same, even if the photo shooting unit 11 focuses on different focus positions on the shot subject 20, the total pixels of the captured first 110' and the second images 120' are substantially the same, so the processing unit 14 determines that the shot subject 20 is a plane image/pattern (a two dimensional object), and a signal indicating that the shot subject 20 is a two dimensional object is sent and is provided to the identification system 10 for future use.

Step 307: determining the shot subject 20 is a three dimensional object for providing to the identification system 10 for further applications:

Refer to FIG. 2A and FIG. 2B, in this embodiment reason for "determining the shot subject 20 is a three dimensional object" is that when the processing unit 14 determines that the total pixels of the first image 110 and the total pixels of the second image 120 are not the same, because the shot subject 20 itself has different field depths, the processing unit 14 can determine the first focus position 111 and the second focus position 121 of the shot subject 20 are not on the same focusing plane, or the shot subject 20 itself has three dimensional outlines (a three dimensional object), a signal indicating that the shot subject 20 is a three dimensional object is sent and is provided to the identification system 10 for future use.

With the feature, illustrated in this embodiment, that the shot subject 20 itself has different field depths, the dimensions of the shot subject 20 (two dimensional or three dimensional) is able to be quickly determined by the present invention, and provide the dimension result to the surveillance system for further applications.

In this embodiment, the feature that the shot subject 20 itself has different field depths is used for determining whether the total pixels of the first image 110 and the total pixels of the second image 120 (or the first image 110' and the second image 120') are the same or not. However, if the first focus position 111 or 111' in the step 301 and the second focus position 121 or 121' in the step 303 are defined at the locations having the same field depths on the shot subject 20, the comparison precision between the captured first image 110 and the second image 120 (or the first image 110' and the second image 120') in the step 305 will be lowered.

Figure 3A:
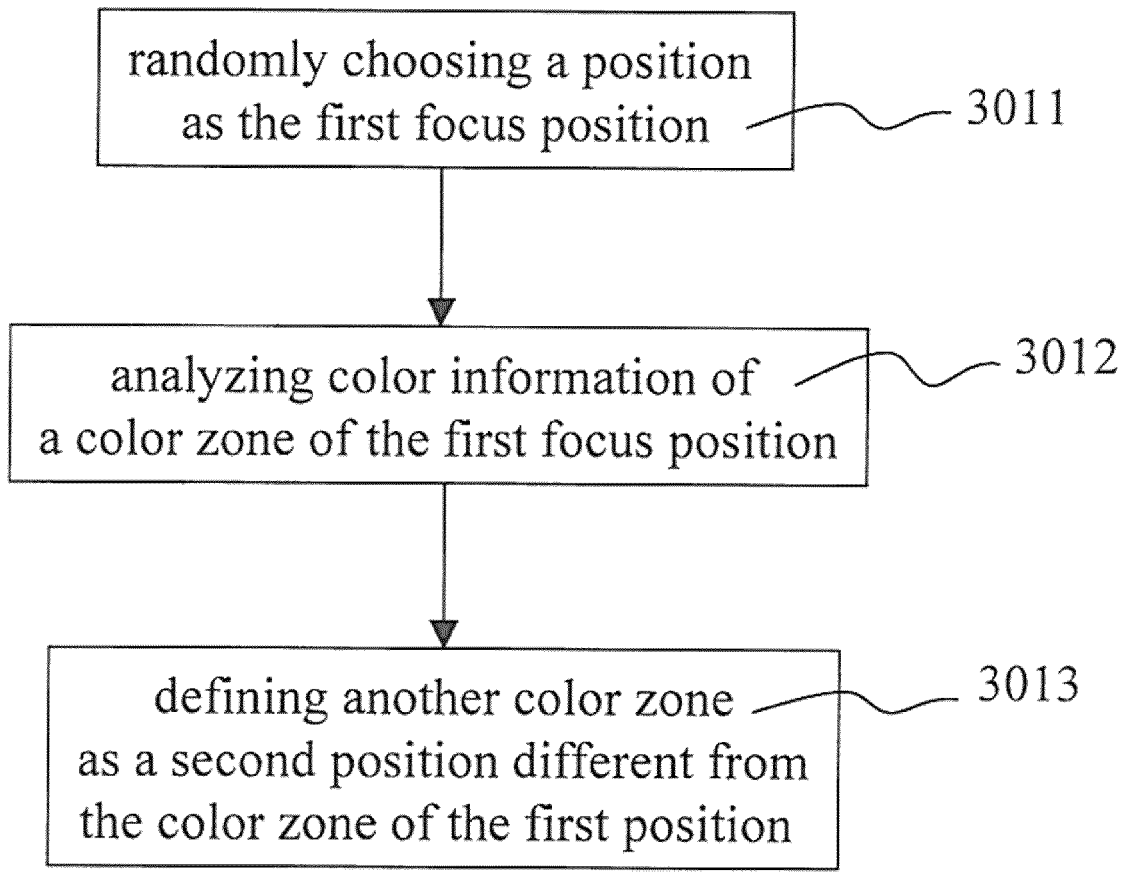
FIG. 3A is a flow chart illustrating detailed steps of choosing focus position in the Step 301 and the Step 303.

Refer to FIG. 3A. FIG. 3A is a flow chart illustrating detailed steps of choosing the focus position in the Step 301 and the Step 303. When referring to FIG. 3A, FIG. 1 and FIG. 2A~FIG. 2D shall be referred together. When the shot subject 20 is in front of the photo shooting unit 11 and is ready to be identified by the system, the processing unit 14 is served to define the first focus position 111 and the second focus position 121 (or the first focus position 111' and the second focus position 121') according to following steps:

Step 3011: randomly choosing a certain position on a lens field of the photo shooting unit 11 and defining the certain position as the first focus position 111 or 111'.

Step 3012: analyzing all color information shown in the lens field and defining plural color zones including the one the first focus position is on.

In this step, before the first image 110 is received by the image processing unit 13, all color information of the shot subject 20 shown in the lens field is analyzed, and plural color zones are defined according to similar color information. Thus, the color information in each of the color zones is similar, including a color zone where the first focus position 111 or 111' is on, so within each of the color zones the color information is very similar, e.g. a color close to skin color or a black color similar to black hair.

Step 3013: defining another color zone as a second position different from the color zone of the first position.

with respect to all color information of all the color zones shown in the lens field, another color zone different from the color zone where the first focus position 111 is on is chosen and defined as a second focus position 121. Because the color information of the first focus position 111 (111') is different from that of the second focus position 121 (121'), the possibility that the second focus position 121 (121') and the first focus position 111 (111') are defined in a same field depth is reduced. So according to the color zones defined by the image processing unit 13, the second focus position 121 (121') is defined by the processing unit 14 at a color zone different from the color zone where the first focus position 111 (111') is defined.

For instance, the center of the lens field can be selected as the first focus position 111, and any location away from the center but still within the lens field, e.g. an edge location of the lens field, can be chosen as the second focus position 121.

So the possibility that the first focus position 111 and the second focus position 121 defined in a same field depth on the shot subject 20 is reduced, the precision of determining dimensions of the shot subject 20 is therefore increased.

Figure 4A:
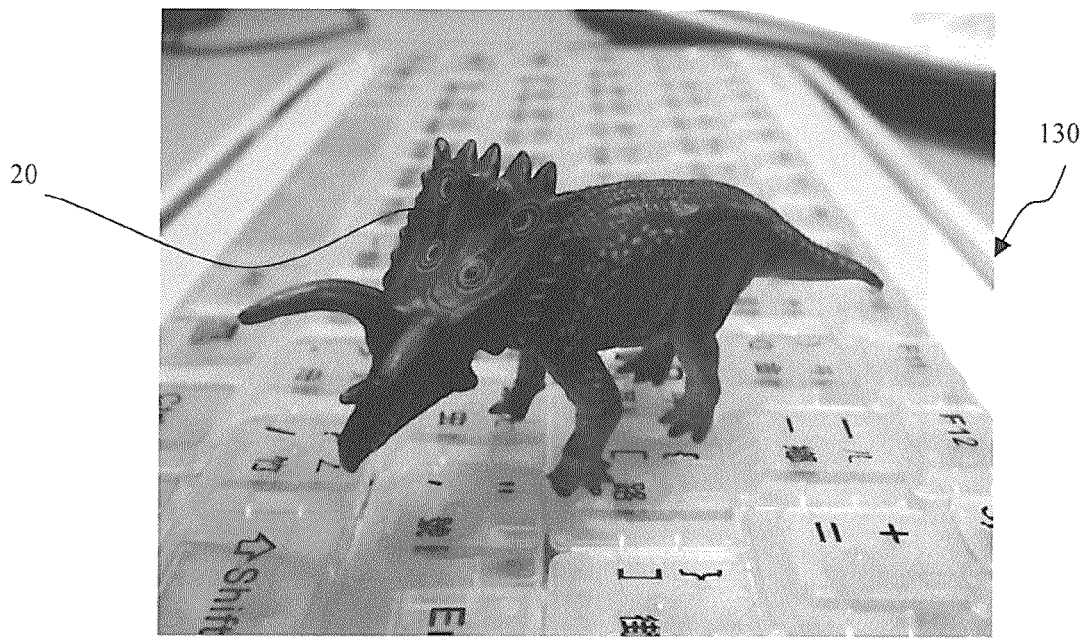
FIG. 4A is a schematic view illustrating a three dimensional shot subject being focused by a photo shooting unit.
Figure 4B:
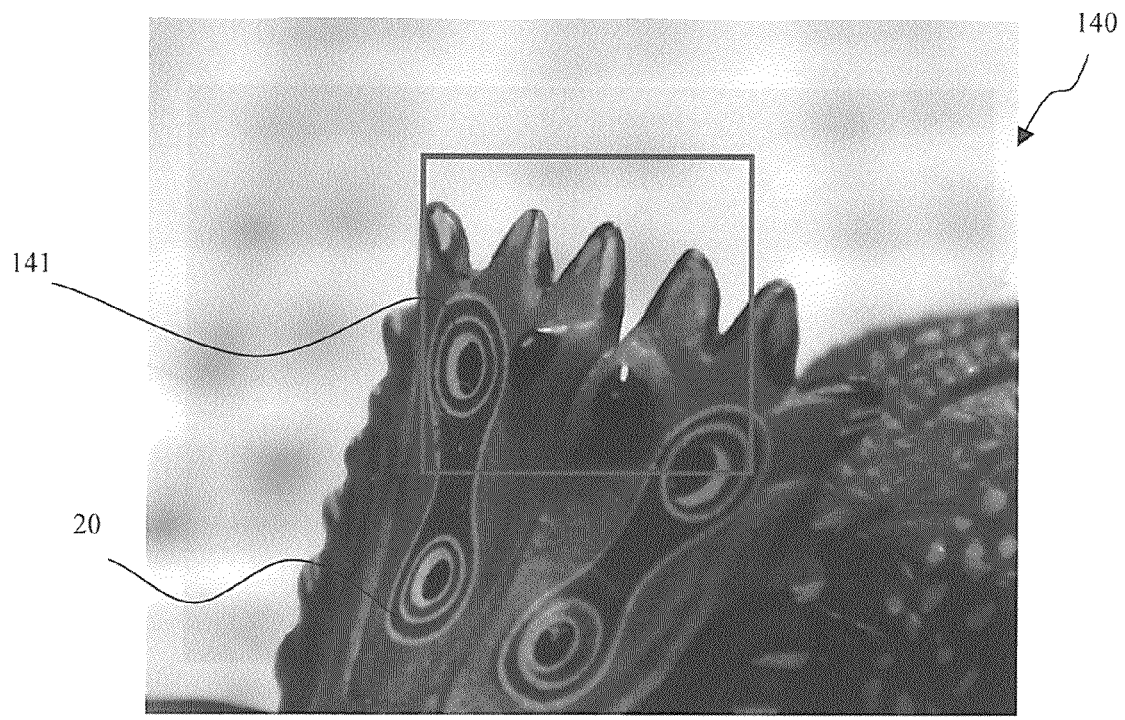
FIG. 4B is schematic view illustrating a zoomed part of a three dimensional shot subject being focused by the photo shooting unit.

Feature two: resolutions of images of a three dimensional object shot from a same photo shooting unit 11 never changing Another embodiment is shown in FIG. 4A and FIG. 4B. Refer to FIG. 4A and 4B while also referring to FIG. 1. FIG. 4A is a schematic view illustrating a three dimensional shot subject being focused on by a photo shooting unit; FIG. 4B is schematic view illustrating a zoomed part of a three dimensional shot subject being focused on by a photo shooting unit. When a part of the shot subject 20 is zoomed in on by the lens of the photo shooting unit 11 with a certain image magnification ratio, as long as the shot subject 20 is a real object and also has three dimensional outlines, the photo shooting unit 11 is able to re-focus on the zoomed part of the shot subject 20.

Thus, according to an output resolution set of the photo shooting unit 11, when the photo shooting unit 11 captures the image of the zoomed part of the shot subject 20 and the image of the whole shot subject 20, both of its the resolutions defined are the same.

Figure 4C:
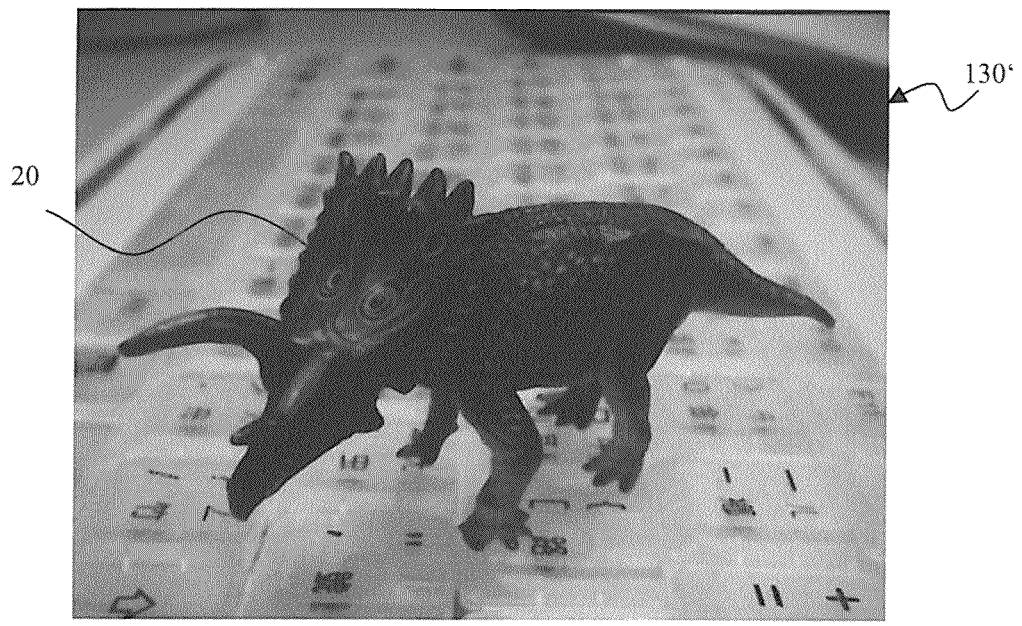
FIG. 4C is a schematic view illustrating a two dimensional shot subject being focused by the photo shooting unit.
Figure 4D:
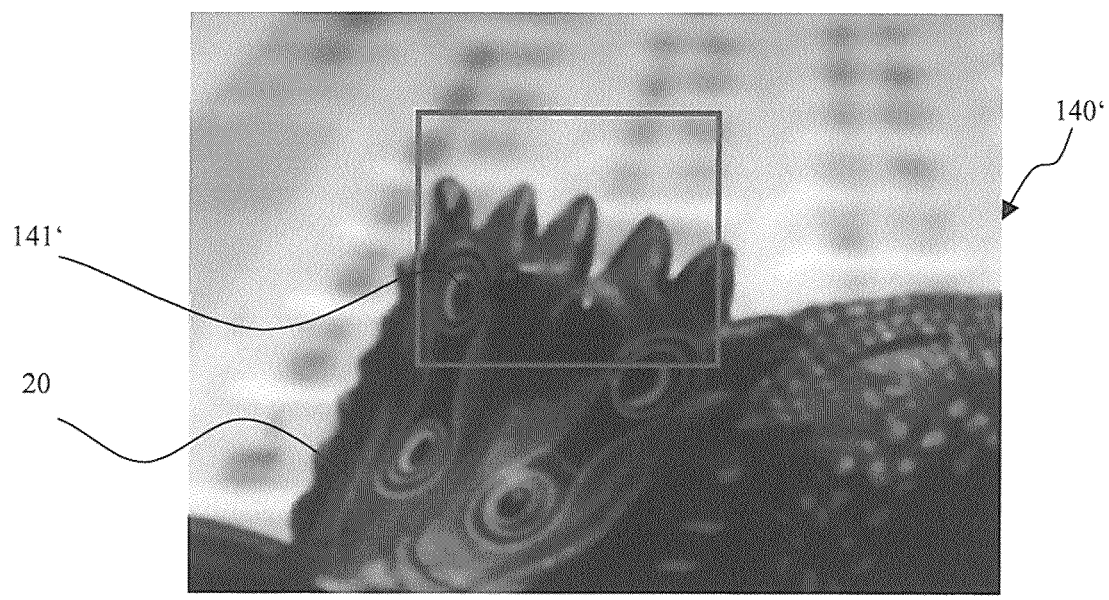
FIG. 4D is a schematic view illustrating a zoomed part of a two dimensional shot subject being focused by the photo shooting unit.

Refer to FIG. 4C and FIG. 4D, while also referring to FIG. 1. FIG. 4C is a schematic view illustrating a two dimensional shot subject being focused on by the photo shooting unit 11;

FIG. 4D is a schematic view illustrating a zoomed part of a two dimensional shot subject being focused on by the photo shooting unit 11.

If the shot subject 20 is a specially-converted plane image/pattern instead of real one, the resolution of the plane image/pattern of the shot subject 20 is fixed, so when a part of the shot subject 20 is zoomed in by the lens of the photo shooting unit 11 with a certain image magnification ratio, the zoomed part of the shot subject 20 is not able to be re-focused by the photo shooting unit 11, therefore the zoomed part of the shot subject 20 is vague. In other words, the resolution of FIG. 4D (the image of the zoomed part of the shot subject 20 shot by the photo shooting unit 11) is not the same as the resolution of FIG. 4C.

Figure 5:
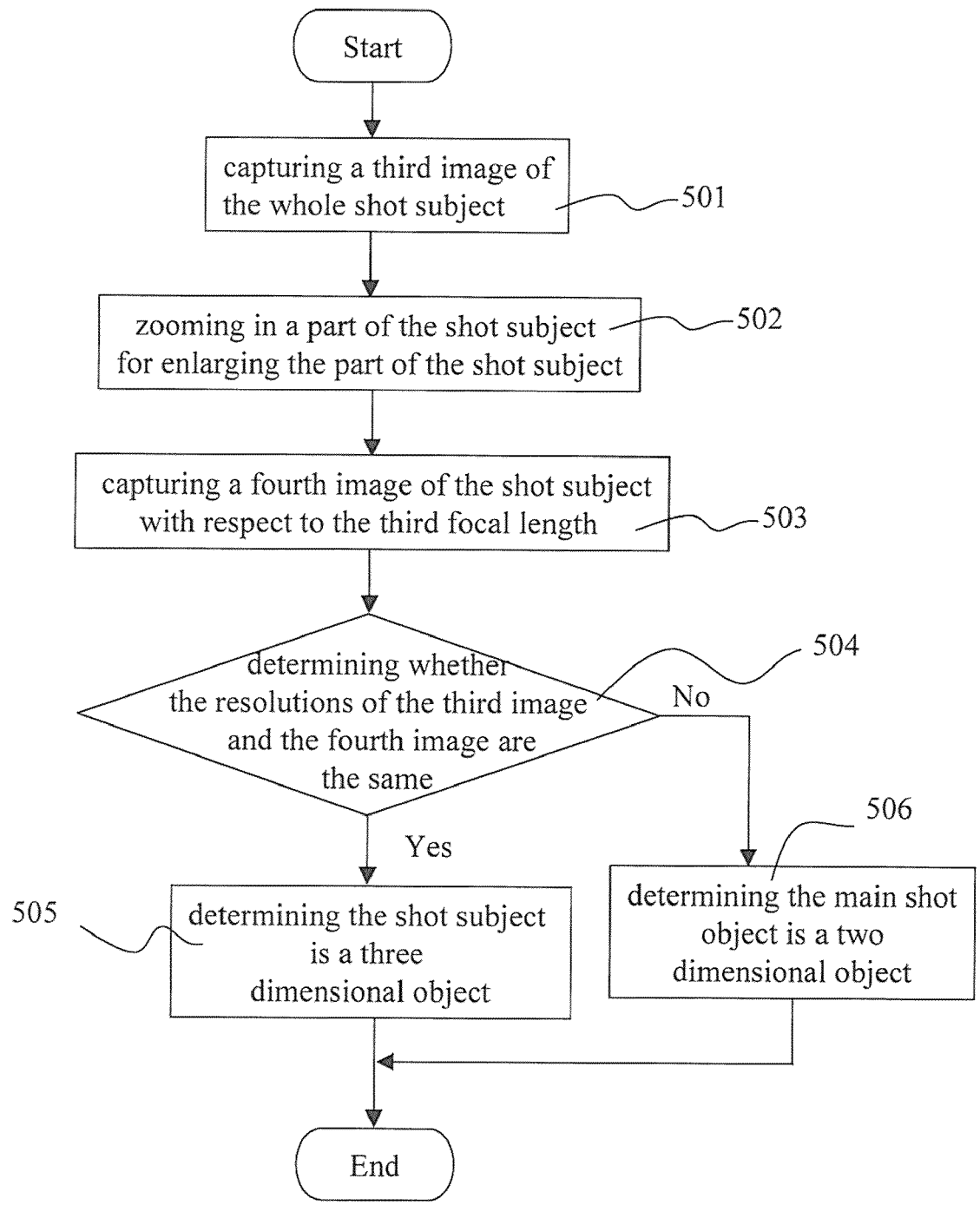
FIG. 5 is a flow chart of another embodiment of a method for identifying dimensions of a shot subject provided by the present invention.

Refer to FIG. 5. FIG. 5 is a flow chart of another embodiment of a method for identifying the dimensionality of a shot subject provided by the present invention. When a shot subject 20 faces the photo shooting unit 11 of the identification system 10 for an identification operation, with respect to the feature of fixed resolution, steps for the processing unit 14 determining dimensions of the shot subject 20 are as follows (referring to FIG. 5 and FIG. 1):

Step 501: capturing a third image 130 or 130' of the whole shot subject 20 (referring to FIG. 4A and FIG. 4C).

In this step, a lens field of the shot subject 20 is defined by the photo shooting unit 11, and a focusing function of the photo shooting unit 11 is activated by the processing unit 14, so an image of the whole shot subject 20 is captured by the photo shooting unit 11 via a full-scale focusing operation, and a third image 130 or 130' is obtained. For example while the output resolution set of the photo shooting unit 11 to process a shooting operation is controlled in 1024×768 pixels, then of course, the resolution of the third image 130 or 130' is 1024×768 pixels.

Step 502: zooming in a part of the shot subject 20 with an image magnification ratio for enlarging the part of the shot subject 20 (referring to FIG. 4B and FIG. 4D) and focusing on the zoomed part of the shot subject 20.

In this step, a part of the shot subject 20 is zoomed in by the lens of the photo shooting unit 11 with a certain image magnification ratio, and a focusing operation is processed on the zoomed part of the shot subject 20 via a third focus position 141 or 141' so a third focal length is adjusted and obtained; with respect to the third focal length, the zoomed part of the shot subject 20 is adjusted to an optical status by the photo shooting unit 11.

Step 503: capturing a fourth image 140 or 140' of the shot subject 20 with respect to the third focal length.

In this step, a fourth image 140 or 140' of the shot subject 20 is captured by the photo shooting unit 11 according to the third focal length; wherein when the third image 130 and the fourth image 140 (or the third image 130' and the fourth image 140') are captured, the same output resolution set of the photo shooting unit 11 to process a shooting operation is adopted.

The photo shooting unit 11 not only can capture a fourth image 140 or 140' of the zoomed part of the shot subject 20, but also can capture more images 140 or 140' of the zoomed part of the shot subject 20 for increasing the sampling accuracy.

Step 504: comparing the third image 130 and the fourth image 140 (or the third image 130' and the fourth image 140') and determining whether the resolution of the third image 130 and the resolution of the fourth image 140 (or the resolution of the third image 130' and the resolution of the fourth image 140') are the same or not.

Whenever an image is captured by the photo shooting unit 11, the image is temporarily stored in the storing unit 12, the image processing unit 13 is served to calculate total pixels of the image stored in the storing unit 12 so when at least two images are captured, a resolution comparison is able to be processed by the processing unit 14. When the processing unit 14 determines that the total pixels of the third image 130 and the total pixels of the fourth image 140 (or the total pixels of the third image 130' and that of the fourth image 140') are the same, the shot subject 20 is determined to be a three dimensional object and a Step 505 is processed next; when the processing unit 14 determines that the total pixels of the third image 130 and the fourth image 140 (or the total pixels of the third image 130' and the total pixels of the fourth image 140') are not the same, the shot subject 20 is determined to be a two dimensional object and Step 506 is processed next.

In this step, means of calculating the total pixels of the third image 130 and the total pixels of the fourth image 140 (or the total pixels of the third image 130' and the total pixels of the fourth image 140') and means of comparing the resolution of the third image 130 and the resolution of the fourth image 140 (or the resolution of the third image 130' and the resolution of the fourth image 140') are not limited.

Step 505: determining the shot subject 20 is a three dimensional object for providing to the identification system 10 for further applications (refer to FIG. 4A and FIG. 4B).

In this embodiment, the reason that the processing unit 14 determines "the shot subject 20 is a three dimensional object" is when the processing unit 14 determines that the third image 130 and the fourth image 140 have the same total pixels, e.g. 1024×768 pixels, the zoomed part of the shot subject 20 is captured and defined as the fourth image 140, so the photo shooting unit 11 is still able to provide a clear resolution according to the output resolution set of the photo shooting unit 11. Therefore the processing unit 14 determines that the shot subject 20 itself has three dimensional outlines (is a three dimensional object) and is defined as a real object, and a signal indicating that the shot subject 20 is a three dimensional object is sent and is provided to the identification system 10 for future use.

Step 506: determining the shot subject 20 is a two dimensional object for providing to the identification system 10 for further applications (referring to FIG. 4C and FIG. 4D).

In this embodiment, the reason that "the shot subject 20 is a two dimensional object" is when the processing unit 14 determines the total pixels of the third image 130' and the pixels of the zoomed part of the shot subject 20 in the fourth image 140' are less than a number, e.g. 1024×768, of the output resolution set of the photo shooting unit 11. So the processing unit 14 determines that the shot subject 20 is a converted plane image/pattern (e.g. two dimensional object) and the total pixels thereof are fixed, and a signal indicating that the shot subject 20 is a two dimensional object is sent and is provided to the identification system 10 for further applications.

With the method for identifying dimensions of shot subject provided by the present invention, the identification system 10 is able to instantly identify the dimensions of the shot subject 20, so a fake object is able to be screened, and a signal sent by the processing unit 14 after determining the dimensions is able to be provided to the identification system 10 for future use. For example only when the shot subject 20 is identified as a three dimensional object, the identification system 10 processes a face features or a pupil identifying mechanism on the shot subject 20 with respect to the face and the pupil information stored in the storing unit 12, so the usage of the identification system 10 is more efficient and the identification system 10 is not limited in the describe functions and can be applied to subsequent or other applications.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for identifying dimensions of a shot subject, implemented on an identification system having a photo shooting unit capable of adjusting focal lengths, the method comprising:

using the photo shooting unit to focus on plural positions respectively having different field depths on a shot subject and capture plural images of the focused positions on the shot subject;

comparing and determining whether resolutions of the captured images are same or not; and when the resolutions of the captured images are the same, the shot subject is a two dimensional object; when the resolutions of the captured images are not the same, the shot subject is a three dimensional object.

2. The method as claimed in claim 1, wherein steps for using the photo shooting unit to focus on the positions respectively having different field depths on the shot subject and capture the images of the focused positions on the shot subject, further comprise:

obtaining a first focal length by focusing a first position in the shot subject;

capturing a first image of the shot subject with respect to the first focal length;

obtaining a second focal length by focusing a second position in the shot subject; and capturing a second image of the shot subject with respect to the second focal length.

3. The method as claimed in claim 2, wherein steps for comparing and determining whether the resolutions of the captured images are same or not, further comprise:

calculating total pixels of the first image and total pixels of the second image, respectively; and determining whether the total pixels of the first image and the total pixels of the second image are the same.

4. The method as claimed in claim 3, wherein respectively calculating partial pixels of the first image only at the first position and partial pixels of the second image only at the second position by using the identification system.

5. The method as claimed in claim 2, wherein a way for choosing the first position and the second position further comprises:

randomly choosing a position on a lens field of the photo shooting unit as the first position;

defining a color zone where the first position is on, according to color information of the first position of the lends field; and defining another color zone as the second position, wherein, the other color zone is different from the color zone where the first position is on.

6. The method as claimed in claim 2, wherein a way for choosing the first position and the second position further comprises:

choosing a central position on a lens field of the photo shooting unit as the first position; and choosing a position away from the central position on the lens field of the photo shooting unit as the second position.

7. A method for identifying dimensions of a shot subject, implemented on an identification system having a photo shooting unit capable of adjusting focal lengths, the method comprises:

using the photo shooting unit to capture an image of a shot subject;

using the photo shooting unit to zoom in a part of the shot subject;

using the photo shooting unit to focus on the zoomed part of the shot subject and to capture another image of the zoomed and focused part of the shot subject;

comparing and determining whether resolutions of the captured images are same or not; and when the resolutions of the captured images are the same, the shot subject is a three dimensional object; when the resolutions of the captured images are not the same, the shot subject is a two dimensional object.

8. The method as claimed in claim 7, wherein steps for using the photo shooting unit to capture the image of a shot subject, further comprise:

focusing on the whole shot subject via a full-scale focusing fashion; and capturing the focused shot subject into a third image according to an output resolution set of the photo shooting unit.

9. The method as claimed in claim 8, wherein steps for using the photo shooting unit to zoom in the part of the shot subject, to focus on the zoomed part of the shot subject and to capture the another image of the zoomed and focused part of the shot subject, further comprise:

obtaining a third focal length by focusing the zoomed part of the shot subject; and capturing a fourth image of the zoomed part of the shot subject with respect to the third focal length according to the output resolution set of the photo shooting unit.

10. The method as claimed in claim 9, wherein steps for comparing and determining whether the resolutions of the captured images are the same, further comprise:

calculating total pixels of the third image and total pixels of the fourth image, sequentially; and determining whether the total pixels of the third image and the total pixels of the fourth image are the same.

* * * * *